Nov. 10, 1959 W. E. KOCK 2,912,061
APPARATUS FOR UTILIZATION OF HIGHER ORDER ACOUSTIC WAVES
Original Filed July 8, 1953 5 Sheets-Sheet 1

→ DIRECTION OF DISPLACEMENT
+ CONDENSATION
− RAREFACTION
0 NORMAL PRESSURE

INVENTOR
W. E. KOCK
BY
ATTORNEY

Nov. 10, 1959 W. E. KOCK 2,912,061
APPARATUS FOR UTILIZATION OF HIGHER ORDER ACOUSTIC WAVES
Original Filed July 8, 1953 5 Sheets-Sheet 3

INVENTOR
W. E. KOCK
BY
ATTORNEY

Nov. 10, 1959 W. E. KOCK 2,912,061
APPARATUS FOR UTILIZATION OF HIGHER ORDER ACOUSTIC WAVES
Original Filed July 8, 1953 5 Sheets-Sheet 4

INVENTOR
W. E. KOCK
BY
ATTORNEY

Nov. 10, 1959 W. E. KOCK 2,912,061
APPARATUS FOR UTILIZATION OF HIGHER ORDER ACOUSTIC WAVES
Original Filed July 8, 1953 5 Sheets-Sheet 5

INVENTOR
W. E. KOCK
BY
ATTORNEY

United States Patent Office 2,912,061
Patented Nov. 10, 1959

2,912,061

APPARATUS FOR UTILIZATION OF HIGHER ORDER ACOUSTIC WAVES

Winston E. Kock, Basking Ridge, N.J., assignor to Bell Telephone Laboratories, Incorporated, New York, N.Y., a corporation of New York Original application July 8, 1953, Serial No. 366,820, now Patent No. 2,812,032, dated November 5, 1957. Divided and this application June 28, 1956, Serial No. 594,408

8 Claims. (Cl. 181—31)

This invention relates to arrangements for generating, resonating, propagating, and utilizing elastic waves of transverse mode in wave guides and resonators.

This application is a division of my copending application, Serial No. 366,820, filed July 8, 1953, now Patent No. 2,812,032, issued November 5, 1957.

An object of the invention is to generate such waves by means of an exciting source of longitudinal waves, such as ordinary sound waves or supersonic vibrations.

Another object is to suppress waves of longitudinal mode in a wave guide wherein a transverse mode is desired.

Another object is to use the special properties of transverse modes in directionally sensitive devices operating with elastic waves.

In accordance with the invention, wave guides and resonators are provided which are especially adapted to support the desired transverse modes and to utilize the waves for various purposes, such as modulation, attenuation, direction finding, selective transmission, mode changing, broad band transmission, etc.

Figure 1:
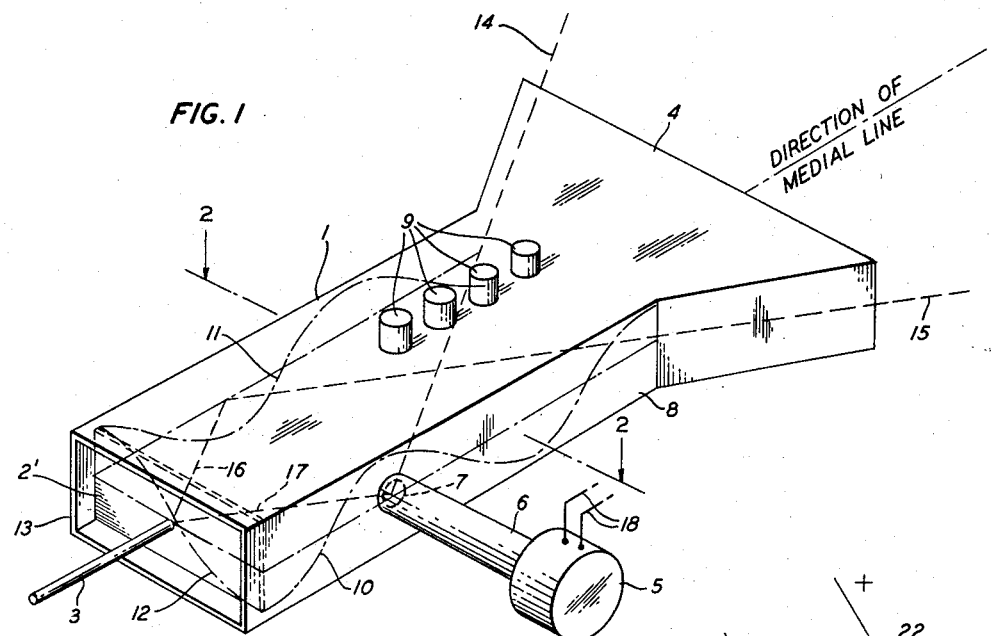
Figs. 1 and 2 are a perspective view and a plan view respectively, both partly diagrammatical, of a direction finder utilizing the invention.

Fig. 1 shows a combination of wave guide and horn for elastic waves in a fluid medium whereby there is provided a double-lobed pattern of directional selectivity. The wave guide 1 is of rectangular cross-section with one end closed by a piston 2' movable in the axial direction of the wave guide by means of a rod 3. The opposite end of the wave guide opens into a horn 4 which flares out in the direction of the longer cross-sectional dimension of the wave guide. A transducer 5 of elastic waves is shown coupled through a hollow tube 6 to the wave guide 1 through a hole 7 in wall 8, one of the narrower side walls of the guide. The transducer may comprise an electromechanical transducer of any known variety and may be designed specifically for transmission or reception, or the type of transducer used may be one adapted to operate alternately as a transmitter and as a receiver.

Along the medial line of one of the wider side walls of the guide there are provided a plurality of hollow stub tubes 9 which open into the interior of the guide and are closed at their outer ends. An instantaneous pressure pattern along the wall 8 containing the hole 7 is shown in dot-dash line 10. Similar pressure patterns 11 and 12 are shown for the wall 13 opposite the hole 7 and for the inner surface of the piston 2', respectively. Representative rays 14, 15, 16, 17, of elastic wave energy are shown by dash lines, the ray 14 entering the wave guide through the horn 4 and ending at the hole 7. Following the ray 15 from right toward left, the ray enters the horn 4 at an angle to the ray 14 and gives rise by reflection to the ray 16 at the wall 13 and to the reflected ray 17 at the surface of the piston 2'. The ray 17 extends to the hole 7. Electrical leads 18 are shown coming out of the transducer 5.

Figure 2:
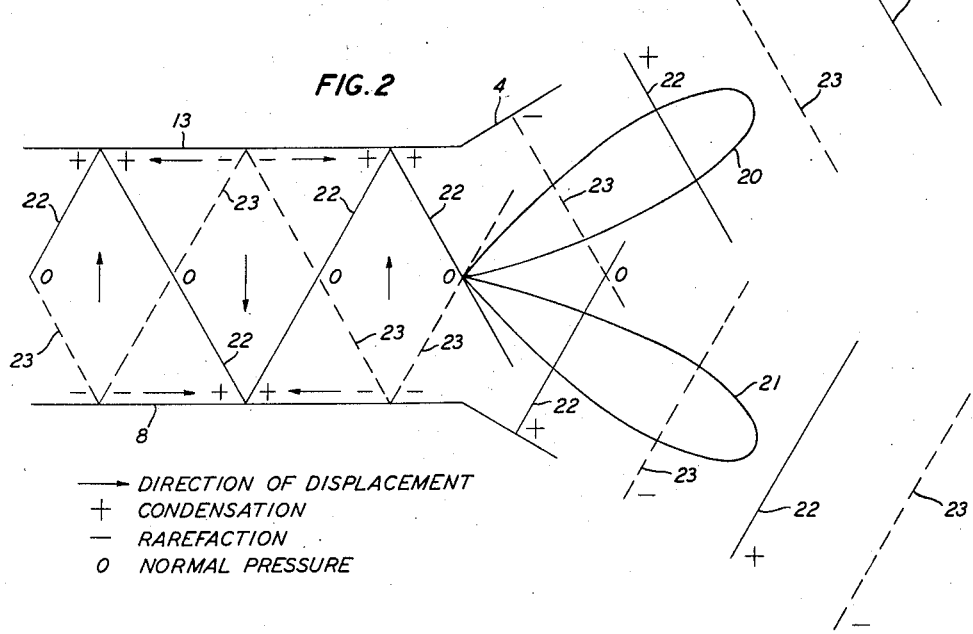

The device of Fig. 1 may be used as a direction finder for elastic waves, as will be more clearly understood by reference to Fig. 2. A plan view of the device of Fig. 1 is shown diagrammatically in Fig. 2, wherein traces of the walls 8 and 13 and the horn 4 are seen.

In the operation of the device of Fig. 1 as a direction finder, the device is pointed with the horn opening in the general direction of a source of elastic waves. The directional sensitivity of the device is shown in conventional manner by means of lobes 20 and 21. If the device is not accurately aimed with its longitudinal axis in the direction of the approaching elastic waves, a signal will be received predominately on one or the other of the lobes. When properly aimed a minimum or null response is obtained in the receiver. By moving the device about, the apparent direction of the wave source can be determined in a manner familiar to users of direction finders.

The piston 2' may be adjusted to bring a maximum pressure variation point in the standing wave pattern to coincide with the position of the hole 7 at the entrance of the tube 6 thereby tuning the system to the desired operating frequency.

Fig. 2 shows the pattern of pressure wave fronts such as may exist in the device of Fig. 1 at a given instant, assuming that waves of a given frequency above the cut-off frequency of the wave guide are propagating through the wave guide and horn and thence into space. The solid lines 22 represent wave fronts of maximum condensation of the fluid medium, that is, wave fronts of maximum pressure. The broken lines 23 represent wave fronts of maximum rarefaction of minimum pressure. These two sets of wave fronts combine to form an interference pattern characterized by regions of normal pressure marked in the figure by small circles spaced along the medial line of the wave guide, regions of condensation marked by plus signs, and regions of rarefaction marked by minus signs. The whole pattern shown in Fig. 2 moves along in the direction of propagation, the individual wave fronts following zig-zag paths due to repeated reflections at the narrower walls 8 and 13 of the wave guide. Although the two sets of waves make a cross-cross pattern inside the wave guide, each set emerges substantially independently from the open end. The flared horn 4 may be omitted if desired, but it contributes to the formation of sharp beams if the flare is adjusted to the direction perpendicular to the wave front. The angle at which the beams emerge is a funtion of the operating frequency.

Directions of displacement of the fluid particles in various regions are indicated by arrows. Close to the walls 8 and 13 the displacements are constrained to be parallel to the walls. The wave motion causes these particles to move toward certain points along the walls where instantaneous regions of condensation are caused to form and away from other points where instantaneous regions of rarefaction are caused to form. In the mode of propagation illustrated the pattern is asymmetrical with respect to the medial line of the wave guide, meaning that a region of condensation at the wall 8, for example, is always found opposite a region of rarefaction at the wall 13. In this mode it follows that the emerging beams, corresponding to the lobes 20 and 21 respectively are 180 degrees out of phase, a wave front of condensation in lobe 20 emerging at the same instant as a wave front of rarefaction in lobe 21, and so on.

In reception, a wave entering the horn 4 along the medial line will set up two trains of interfering waves which cancel each other at the entrance of the tube 6 and give a minimum or null response in the transducer 5 used as a receiver. Waves entering the horn in the directions of lobe 20 or lobe 21 respectively will produce maximum response, but in opposite phase, and this phase difference can be used in known manner to determine in which direction to turn the direction finder to aim the medial line in the direction of propagation of the received wave.

The device of Fig. 1, while similar in structure and theory of operation to an electromagnetic system in many respects, differs from an electromagnetic system in at least one important respect. The rectangular wave guide containing a fluid will propagate plane elastic waves though it will not propagate plane electromagnetic waves. Incoming plane elastic waves will set up plane elastic waves in the wave guide of Fig. 1 which will predominate over any of the waves shown in Fig. 2 unless preventive measures are taken. The device of Fig. 1 when operated with plane waves is single-lobed and does not possess the advantages of a double-lobed device.

To suppress the plane wave mode in the wave guide 1 a plurality of resonators 9 that are of quarter wavelength for the longitudinal mode are placed along the medial line. These resonators operate as pressure releasing devices for the desired mode, which mode is characterized by normal pressure all along the medial line. Plane waves on the other hand are characterized by condensations and rarefactions extending across the entire width of the guide from wall 8 to wall 13. The quarter-wavelength resonators serve as wave traps to damp out the plane waves, leaving the desired mode relatively undisturbed.

The plane wave mode may be utilized together with the asymmetrical mode in a direction finder, the outgoing beam being formed in single lobe using the plane wave mode and the reflected beam being received over the double-lobed system. The two modes may be propagated simultaneously and if the plane wave mode tends to interfere with a null indication in the receiver, the number and tuning of the resonators 9 may be adjusted to give the desired amount of suppression of the plane wave mode.

The device of Figs. 1 and 2 makes use of the superposition of two wave trains in a wave guide and the separation of these trains upon emergence from the wave guide into the horn.

Other embodiments to be described hereinafter make use of the direction of motion of the individual particles of the transmission medium, particularly the transverse motion which appears in the region of the medial plane of the wave guide and the transverse component of motion that appears to greater or less extent everywhere except close to the side walls.

Figure 3:
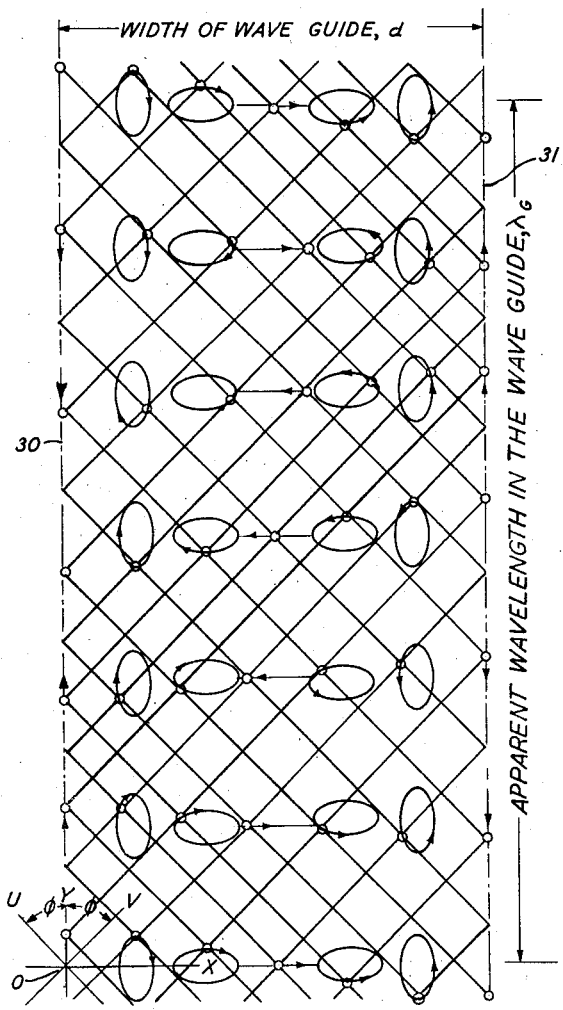
Fig. 3 is a diagram representative of the type of waves contemplated herein.

The type of wave propagation utilized in the present invention is illustrated diagrammatically in Fig. 3. Similarly to the case of electromagnetic waves in hollow-pipe wave guides, two superposed wave trains of the same frequency, wavelength, and amplitude are contemplated which are propagated in respective directions obliquely inclined to each other. In a special case, selected for ease in constructing the orbits of particles in the medium, Fig. 3 shows wave trains propagated at right angles. One train is propagated in the direction of the U axis, OU, in the figure. The other train is propagated along the V axis, OV. The X axis, OX, is taken to lie in the direction crosswise of the wave guide, the Y axis, OY, being parallel to the longitudinal axis of the wave guide. The U and V axes are inclined to the Y axis each by the same angle $\varphi$, which in Fig. 3 is 45 degrees.

The wave trains each comprise plane compressional waves, that is, ordinary sound waves or supersonic waves, depending upon the frequency. The waves are characterized by nature in that the wave in acting upon a particle of the medium, exerts a force upon the particle urging it away from its equilibrium position, to or fro, in the direction in which the wave is being propagated. The medium, for purposes of the present invention, is taken to be a fluid and the wave guide is assumed to be composed of a material having a relatively high resistance to particle displacement compared to the medium in the wave guide. When two or more of the wave trains act upon the same particle the particle is urged to move in the direction of the resultant of the forces exerted upon the particle by the respective waves. For simplicity, it will be assumed that the particle displacement is at all times proportional to and in phase with the resultant force acting upon the particle.

The component $w_u$ of particle displacement resulting from the wave along the U axis may be represented by $$w_u = u_1 A \cos\left[\omega t - \frac{2\pi}{\lambda}(x \cos \varphi + y \sin \varphi)\right] \quad (1)$$

where $u_1$ is a unit vector in the direction of the U axis, $\omega$ is $2\pi$ times the frequency $f$, $\lambda$ is the wavelength, and $A$ is a factor of proportionality.

Similarly, the component $w_v$ of particle displacement resulting from the wave along the V axis may be represented by $$w_v = v_1 A \cos\left[\omega t - \frac{2\pi}{\lambda}(x \cos \varphi - y \sin \varphi)\right] \quad (2)$$

where $v_1$ is a unit vector in the direction of the V axis.

The Expressions 1 and 2 may be transformed to refer to the X and Y axes in place of the U and V axes by applying the well known type of transformation, in which $$u_1 = i \cos \varphi + j \sin \varphi \quad (3)$$
$$v_1 = i \cos \varphi - j \sin \varphi \quad (4)$$

where $i$ and $j$ are unit vectors along the X and Y axes respectively.

After applying the transformation and combining terms in $i$ and $j$ respectively, the resultant displacement $w_u + w_v$, due to the combined effect of the two wave trains is found to be $$w_u + w_v = 2i \cos \varphi \cos\left(\omega t - \frac{2\pi x}{\lambda} \cos \varphi\right) \cos\left(\frac{2\pi y}{\lambda} \sin \varphi\right)$$
$$- 2j \sin \varphi \sin\left(\omega t - \frac{2\pi x}{\lambda} \cos \varphi\right) \sin\left(\frac{2\pi y}{\lambda} \sin \varphi\right)$$
$$(5)$$

which is seen to constitute two sinusoidal components in space quadrature, 90 degrees different in phase. The amplitudes of these components vary in relative proportions as determined by the factor $$\cos \varphi \cos\left(\frac{2\pi y}{\lambda} \sin \varphi\right) \quad (6)$$

for the $i$-component and, for the $j$-component, $$\sin \varphi \sin\left(\frac{2\pi y}{\lambda} \sin \varphi\right) \quad (7)$$

Thus the particles are moved in orbits some of which are straight lines, and others elliptical of various orientations and degrees of ellipticity, including circular orbits where Expression 6 is equal to Expression 7.

The position of the boundary walls is dependent upon the wavelength $\lambda$ and the angle $\varphi$ as will be seen. At the boundary the necessary condition is that there be no particle motion at right angles to the boundary. This means that the $j$-component is zero at the boundary. From inspection of the factors composing the $j$-component it will be evident that the only way this component can be zero at all times is to have $$\sin\left(\frac{2\pi y}{\lambda} \sin \varphi\right) = 0 \qquad (8)$$

This is satisfied when $$\frac{2\pi y}{\lambda} \sin \varphi = n\pi \qquad (9)$$

where $n$ is any integer, or zero. For $n$ zero, $y$ is zero; and for $n$ equal to one, we have $y$ equal to the narrowest width $d$ of the wave guide that will satisfy the assumed boundary condition, which width comes out to be $$d = \frac{1}{\sin \varphi}\left(\frac{\lambda}{2}\right) \qquad (10)$$

or $$\lambda = 2d \sin \varphi \qquad (11)$$

whereby either $d$ or $\lambda$ may be determined when the other is given.

Using the critical value of $\lambda$ from Equation 11 in Equation 5 one obtains $$w_u + w_v = 2i \cos \varphi \cos\left(\omega t - \pi\frac{x}{d} \cot \varphi\right) \cos\left(\pi\frac{y}{d}\right)$$

$$- 2j \sin \varphi \sin\left(\omega t - \pi\frac{x}{d} \cot \varphi\right) \sin\left(\pi\frac{y}{d}\right)$$

$$(12)$$

From Equation 12 it may be seen that $\lambda_g$, the apparent wavelength of the interference pattern in the wave guide is $$\lambda_g = \frac{2d}{\cot \varphi} \qquad (13)$$

For the special case shown in Fig. 3, the dimensions $d$ and $\lambda_g$ are indicated on the drawing, $\lambda_g$ being equal to $2d$.

Orbits are sketched for some of the particles of the medium, as shown by arrows. The instantaneous positions of the particles in the respective orbits are shown by small circles, for a representative instant of time. The areas and lengths of the orbits are greatly exaggerated in the figure in order to show the motions more clearly.

Wave fronts of equal components of displacement are shown by the sets of intersecting heavy lines. Relative closeness of crowding of these displacement wave fronts indicates a region of relatively high pressure in the medium and wideness of separation of the fronts occurs in a region of relatively low pressure.

The wave pattern in Fig. 3 travels as a whole vertically from the bottom of the sheet toward the top. There is no traveling of the resultant wave from side to side in Fig. 3, the pattern being that of a standing wave set up between the side walls. The walls 30 and 31 shown as traces in Fig. 3 correspond to walls 13 and 8 respectively in a wave guide such as that shown in Fig. 2. The wave pattern is assumed to be identical in all planes parallel to the paper in Figs. 2 and 3, there being no tending of waves to travel perpendicular to these planes and no standing wave pattern in that direction.

It will be seen that at the side walls of the wave guide the particle motion is entirely longitudinal with respect to the direction of propagation of the wave pattern along the wave guide. Along the medial line of the wave guide, on the other hand, the particle motion is actually entirely transverse although the exciting wave trains are both composed purely of longitudinal waves. At other locations in the wave guide there is a superposition of longitudinal and transverse motion. Thus superposition of two purely longitudinal waves gives rise to a resultant wave which may be characterized as a combination of a longitudinal wave and a transverse wave, grading from purely transverse at certain points to purely longitudinal at others.

Particles in positions intermediate between the side wall and the medial plane move in elliptical orbits, grading from ellipses with major axes longitudinal, near the side walls, through circular orbits to ellipses with major axes transverse, near the medial plane. It will be noted, further, that particles on opposite sides of the medial plane move in opposite sense around their respective orbits. The region of the medial plane is one of substantially normal pressure.

Figure 4:
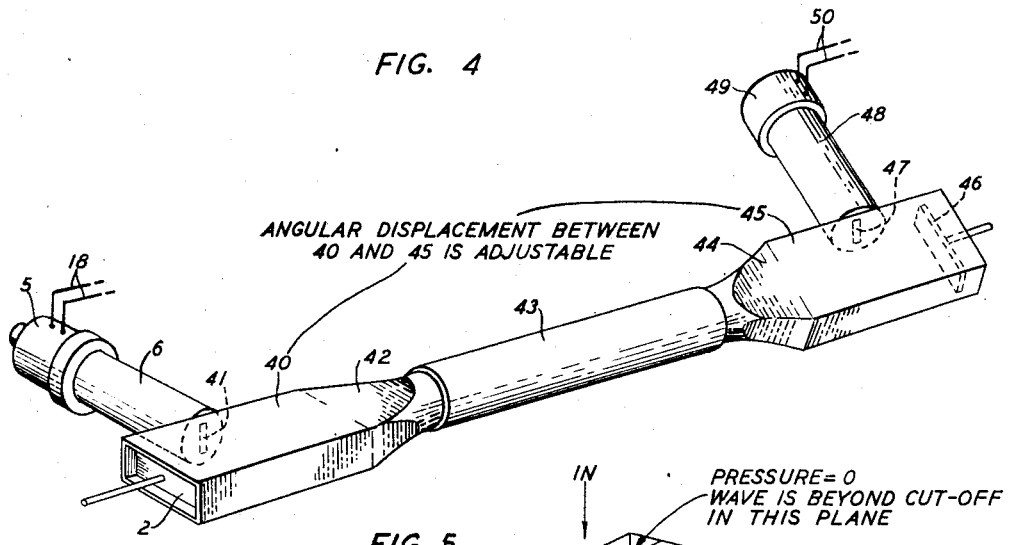
Fig. 4 is a perspective view of a wave guide system utilizing the invention.

Fig. 4 shows a directionally selective transmission system utilizing the transverse mode of wave motion illustrated in Fig. 3.

In Fig. 4, the transducer 5 with electrical leads 18 is shown connected through the hollow tube 6 to a wave guide 40 of rectangular cross-section. A coupling slot 41 is provided in one side wall of the wave guide 40 to pass wave energy from the tube 6 into the wave guide. The slot 41 may be located at a preferred distance from the piston 2' for best conditions of excitation as determined in connection with the system of Fig. 1.

The wave guide 40 is provided with a rectangular to circular transition portion 42 at the end away from the piston 2'. The transition portion 42 is joined to a circular cylindrical wave guide 43 which in turn is joined to a circular to rectangular transition member 44 followed by a rectangular wave guide 45 closed by a piston 46. Means may be provided in any known manner for making wave guides 40 and 45 relatively rotatable about their common longitudinal axis to effect any desired angular displacement between the rectangular wave guides.

A coupling slot 47 is provided in one side wall of the wave guide 45 in a manner similar to that of slot 41 in wave guide 40. A hollow tube 48 similar to tube 6 connects the wave guide 45 to a transducer 49 with electrical leads 50, the transducer 49 being similar to transducer 5 with leads 18. A suitable proportioning of the hollow tubes and rods is one in which the diameter of the tube is about equal to the height of the rectangular wave guide and the slot is narrow and has its longer dimension perpendicular to the broad wall (top or bottom as in guide 40) of the wave guide. In this arrangement the slot coincides with the high pressure region of the standing wave pattern, extending from top to bottom of the wave guide. Alternatively, a round aperture such as hole 7 of Fig. 1 may be used instead of a narrow slot.

In the operation of the system of Fig. 4, the transducer 5 may be operated by means of an electrical input over the leads 18, setting up an ordinary, longitudinal elastic wave within the tube 6, and through the slot 41 setting up in wave guide 40 a wave like that represented in Fig. 3. This wave passes through the transition member 42 and sets up a wave in the circular wave guide 43, with a transverse component in the circular wave guide corresponding to the transverse component in the wave of Fig. 3.

Like an electromagnetic wave in a wave guide, the wave set up in the system of Fig. 4 has a cut-off frequency related to the width of the wave guide in the direction of the transverse vibration. Hence, if the wave guide 45 is rotated to have its narrower dimension perpendicular to the direction of the transverse component in wave guide 40, then the guide 45 may be too narrow to sustain the transverse mode of vibration. At intermediate angular positions of guide 45 relative to guide 40, the amplitude of the transverse vibration set up in guide 45 depends upon the angle. By rotating guides 40 and 45 relatively to each other the amount of wave transmission between the two guides may be varied.

The device of Fig. 4 may be used to determine the direction of the transverse component of a received wave, or to determine when two wave guides are angularly displaced, or to attenuate a traveling wave, or for other purposes.

In the arrangement of Fig. 4 the use of hollow stub tube resonators as shown at 9 in Fig. 1 is advisable and usually necessary to prevent conversion of wave energy into the longitudinal mode.

Figure 5:
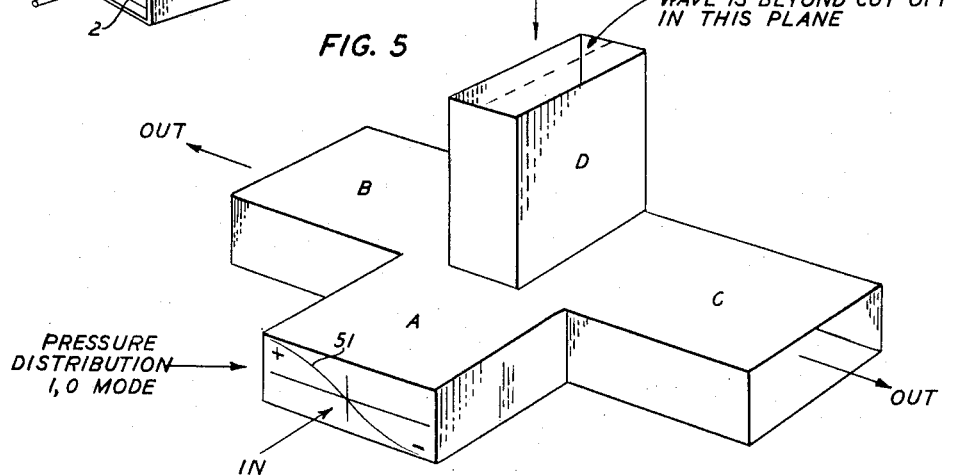
Fig. 5 is a diagram of a selective transmission device.

Because of the presence of a normal undisturbed, so-called zero, pressure plane along the center of a wave guide carrying the transmission mode of Fig. 3, a hybrid junction, sometimes called a "magic T," can be employed to provide selective transmission. Such a hybrid junction is shown in Fig. 5 and has four branches labeled A, B, C, and D, respectively. In branch D, a broken line indicates a trace of the vertical medial plane of zero pressure existing in branch A, extended upward.

In the device of Fig. 5, wave energy in the transverse mode entering branch A of the hybrid junction divides equally between branches B and C, no wave energy going to branch D because the branch D lies where it is coupled mainly to the zero pressure region of the wave in branch A. Similarly, wave energy fed into branch D excites transverse waves in branches B and C but not in branch A because opposing pressure variations are not applied by branch D to regions near opposite side walls of branch A as required to generate the transverse mode in that branch. For best results, here again stub resonators 9 should be used to prevent conversion of wave energy into the longitudinal mode. For reference, an instantaneous pressure variation distribution in branch A is indicated by a graphical curve 51, showing increased pressure at one side wall, decreased pressure at the opposite side wall and normal pressure in the medial region.

Figure 6:
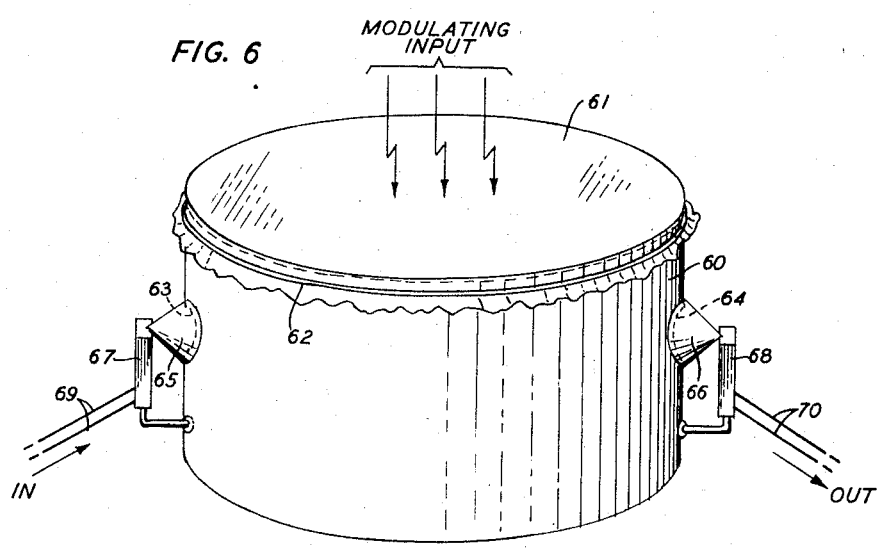
Fig. 6 is a perspective view of a modulator.

Fig. 6 shows a modulator or microphone using waves of transverse mode. A hollow cylindrical resonator 60 is provided, of circular cross-section and having a closed, rigid bottom. The top of the resonator is closed by a flexible diaphragm 61, such as a stretched membrane secured at the edges by a band 62. Coupling apertures 63, 64 are provided as shown at diametrically opposite points in the cylindrical wall, the apertures being covered by diaphragms, 65 and 66 respectively of known type mechanically coupled to piezoelectric elements 67 and 68 respectively. The latter elements are shown diagrammatically with electrical leads 69 and 70 respectively.

Figure 7:
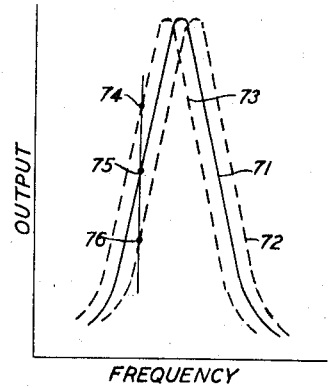
Fig. 7 is a diagram useful in explaining the device of Fig. 6.

The resonator 60 is found to have a steep-sided resonance curve 71 for transverse mode as shown in Fig. 7, corresponding to the property whereby a relatively slight mechanical deformation of the resonator effects a relatively large change in transmission of transverse waves through the resonator from one coupling aperture to the other. Such mechanical deformation is effected by impressing acoustic waves or other longitudinal waves as a modulating input upon the diaphragm 61, thereby alternately increasing and decreasing the resonant frequency as shown by dotted resonance curves 72 and 73 respectively. By transmitting a carrier wave through the resonator, e.g. in through aperture 63 and out by aperture 64 at a frequency lying at a steep part of the curve 71, the output may be varied over a relatively large range as indicated by points 74, 75, 76, shown on the lower side of curves 73, 71, and 72, respectively. Point 74 so chosen corresponds to decreasing the resonant frequency of the resonator, point 75 leaving the resonant frequency unchanged, and point 76 to increasing the resonant frequency of the resonator. By speaking against the diaphragm 61 a speaker may impress speech signals upon the carrier wave passing through the resonator 60. Elastic waves striking the diaphragm thus serve to vary the tuning of the resonator at the periodic rate of the elastic waves. The carrier wave output as from the leads 70 may be rectified in well known manner to recover the signal or other variations present in the impressed elastic waves.

A transverse mode of particular interest in a circular cylindrical resonator is the 0,1-mode. According to the conventional mode designation here used, the first digit 0 denotes zero phase difference around the circumference of the resonator. The second digit 1 denotes one half cycle of phase variation along a radius of the cylinder. The 0,1-cylindrical mode has a wave pattern that may be visualized as being generated by rotation of the pattern of Fig. 3 about one of the side wall traces 30 or 31.

Figure 8:
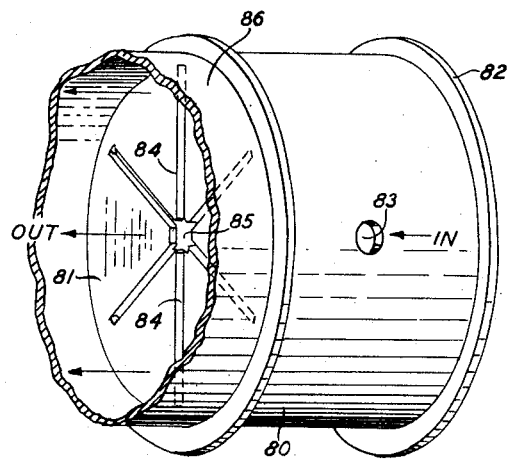
Fig. 8 is a perspective view of a resonator and connecting wave guide.

Fig. 8 shows an arrangement for generating and transmitting a 0,1,1-cylindrical mode wave under excitation from a source of longitudinal waves. Here, the third digit 1 denotes one half cycle of phase variation along the axial length of the cylindrical resonator. A circular cylindrical resonator 80 is provided with rigid end plates 81 and 82. An input aperture 83 is provided in the cylindrical wall midway between the end plates. An output aperture arrangement is provided in one end plate 81 comprising radial slots 84 radiating from a central hole 85. A source of longitudinal (pressure) waves may be connected to the resonator 80 through the aperture 83 in conventional manner. At resonant frequency for the 0,1,0-mode that mode alone is excited in the cavity. The resonator 80 may be coupled through the slots to a circular cylindrical wave guide 86 of the same diameter as and coaxial with, the end plate 81, in which case energy in the 0,1,1-mode is transmitted through the slots in the form of a 0,1-mode traveling wave in the wave guide 86. The arrangement may be regarded as a mode changer, transforming longitudinal waves to transverse or vice versa. Transverse waves can be introduced into the guide 86, and through the slots 84 to the resonator 80 wherein pressure variations will appear at the aperture 83. Longitudinal waves may then be taken off by coupling a receiving device (not shown) to the resonator through the aperture 83.

The 0,1,1-mode can be excited in a circular cylindrical resonator either through a central hole in one of the end plates or through a hole in the side wall, as at aperture 83. This mode has theoretical low loss characteristics which are realized in practice when the frequency is adjusted to the cut-off frequency for this mode in the circular cylindrical resonator. Under this condition the particle motion is entirely transverse to the direction of the central axis of the cylindrical resonator. Since no wave energy is then propagated parallel to the axis of the cylinder, there are no viscous losses at the cylindrical wall of the resonator. The only losses are viscous losses in the medium itself, and end plate losses. The viscous losses in the medium are small except at very high frequencies. The end plate losses are also viscous in nature. They can be made relatively small by making the resonator long, so that relatively little of the medium is near either end plate. In a resonator that was built and tested at a frequency of 4300 cycles, a value of Q of the order of 1000 was obtained.

Second order non-linear effects were observed when in the same circular cylindrical resonator a transverse 0,1,0-mode was excited at the resonant frequency and a longitudinal wave at a lower frequency and at a relatively high intensity level was superposed. The presence of the longitudinal mode at high level caused the resonance curve of the transverse mode to be shifted approximately one cycle from the normal frequency of 4600 cycles. This effect is attributed to increase in the average pressure in the resonator under the action of the superposed longitudinal mode with a consequent increase in the propagational velocity of the transverse mode.

In the 0,1,0-mode, the particle motion is purely transverse. Resonance occurs at the cut-off frequency of the circular cylindrical resonator and hence no wave energy is propagated along the central axis of the resonator.

Figure 9:
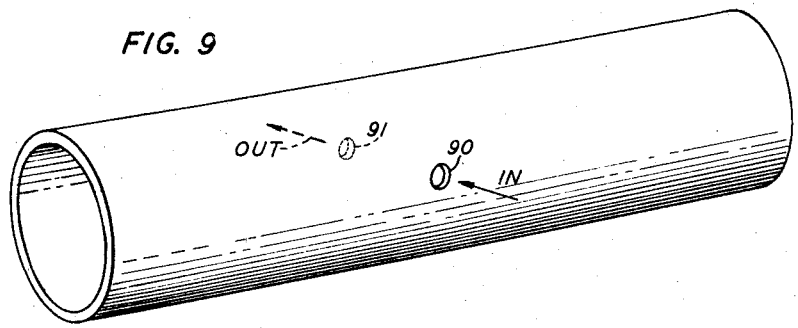
Fig. 9 is a perspective view of an open-ended resonator.

Fig. 9 shows a resonator, comprising an open ended circular cylinder, adapted to support a 0,1,0-mode vibration. As no energy is propagated axially there is no need for end plates. Input and output apertures 90 and 91 respectively are provided at diametrically opposite points in the cylindrical wall, midway between the open ends. Input and output transducers may be provided as in the arrangement of Fig. 6.

In the resonator of Fig. 9, the low loss features of the 0,1,1-mode are present and in addition end plate losses are, of course, avoided. Furthermore, all resonant modes that are dependent upon reflections from end plates are substantially ruled out. These modes include all the longitudinal modes and all transverse modes in which wave energy propagates axially. In a resonator comprising an open ended tube 20 inches long, resonance was observed at 4300 cycles with a value of Q in the order of 1000.

Figure 10:
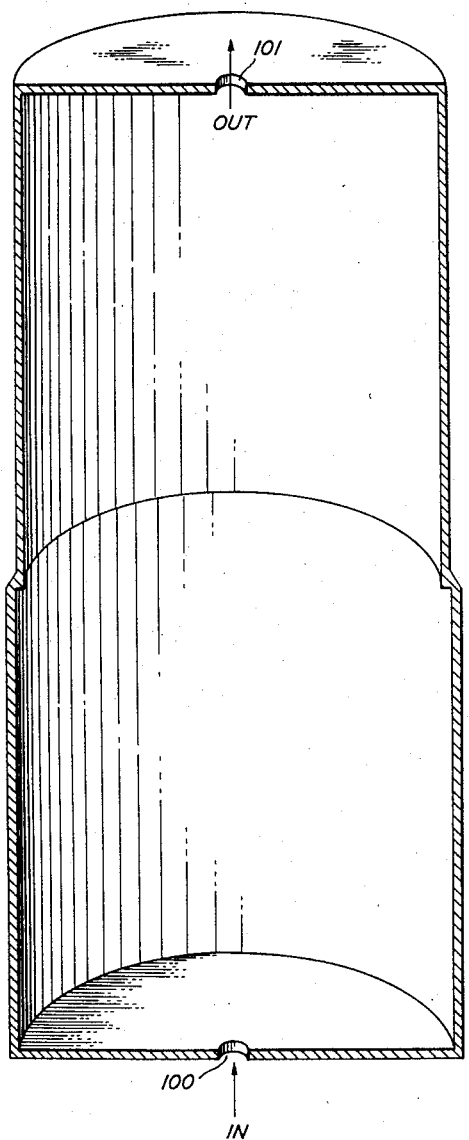
Fig. 10 is a longitudinal sectional view of a doubly-resonant device.
Figure 11:
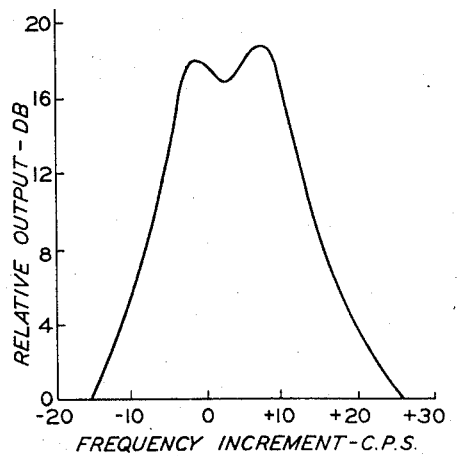
Fig. 11 is a graphical representation of the resonance curve of a device like that shown in Fig. 10.

The 0,1,0-mode may also be maintained in a resonator with closed ends. Fig. 10 shows such a resonator, comprising two circular cylindrical portions of slightly different diameter. The purpose of the different diameters is to produce a double-humped resonance curve as shown in Fig. 11. An input aperture 100 and an output aperture 101 are provided in the lower and upper end plates respectively as shown in the drawing. The device of Fig. 10 may be used as a band pass filter, making use of the broadening of the resonance curve due to the double resonance. Such a resonator which was built and successfully operated as a band pass filter comprised a cylindrical resonator 8 inches long, having a diameter change midway between the ends.

The invention is not to be construed as limited to the particular embodiments, arrangements, or details disclosed herein.

What is claimed is:

1. A modulator for elastic waves comprising a gas-filled right cylindrical resonator having input and output means fixed in the cylindrical wall thereof for respectively exciting a transverse mode of elastic wave energy therein and receiving said energy therefrom, and means for exciting said input means with elastic waves, said cylindrical resonator having first and second end closures at least one of which is susceptible of motion relative to the other to vary the distance therebetween.

2. A combination as recited in claim 1 wherein said first end closure comprises a flexible diaphragm and said second end closure comprises a rigid plate.

3. A combination as recited in claim 1 wherein said input and output means each comprises a circular aperture having a diameter small compared with a wavelength of said transverse mode, said apertures being disposed at diametrically opposite points in said cylindrical wall.

4. A modulator for elastic waves comprising a gas-filled right cylindrical resonator supportive of a transverse mode of elastic wave energy, said cylindrical resonator having a rigid end plate closing one end and a flexible diaphragm closing the other end, input and output acoustically unobstructed apertures disposed at diametrically opposite points in the cylindrical wall of said resonator, and an electromechanical transducer disposed outside said cylindrical resonator to acoustically excite said input aperture.

5. In combination; a right circular cylinder characterized by end closures and a cylindrical wall; a gaseous medium contained within said cylinder; input means disposed in said cylindrical wall for exciting a transverse mode of elastic wave energy in said gaseous medium; output means disposed in said cylindrical wall so proportioned and located as to accept energy from said transverse elastic waves relatively more freely than from longitudinal waves originating at said input means and traveling directly and without wall reflection to said output means; and means for moving at least one of said end closures relative to the other in response to a modulation signal.

6. A combination as recited in claim 5, wherein said input and output means each comprises a circular aperture having a diameter small compared with a wavelength of said transverse mode.

7. A combination as recited in claim 6 wherein said apertures are fixed at diametrically opposite points in said cylindrical wall.

8. In combination; a right circular cylinder characterized by end closures of which one is rigid and the other movable, and a cylindrical wall; a gaseous medium contained within said cylinder; input means disposed in said cylindrical wall for exciting a transverse mode of elastic wave energy in said gaseous medium; output means disposed in said cylindrical wall thereof so proportioned and located as to accept energy from said transverse elastic waves relatively more freely than from longitudinal waves originating at said input means; and means for moving said other end closure in response to a modulation signal.

References Cited in the file of this patent

UNITED STATES PATENTS

| | | |
|---|---|---|
| 2,581,780 | Ahier et al. | Jan. 8, 1952 |
| 2,711,514 | Rines | June 21, 1955 |
| 2,812,032 | Kock | Nov. 5, 1957 |